United States Patent [19]
DeLuca

[11] Patent Number: 5,032,835
[45] Date of Patent: Jul. 16, 1991

[54] OUT OF RANGE INDICATION FOR RADIO RECEIVERS

[75] Inventor: Michael J. DeLuca, Boca Raton, Fla.

[73] Assignee: Motorola, Inc., Schaumburg, Ill.

[21] Appl. No.: 554,942

[22] Filed: Jul. 16, 1990

Related U.S. Application Data

[63] Continuation of Ser. No. 341,876, Apr. 24, 1989, abandoned.

[51] Int. Cl.$^5$ .............................................. H04Q 7/00
[52] U.S. Cl. ........................... 340/825.44; 340/825.26; 340/825.46; 455/343; 455/229
[58] Field of Search ...................... 340/825.44, 825.45, 340/825.46, 825.47, 825.48, 311.1, 825.26, 539, 571; 455/171, 181, 343, 229; 370/106

[56] References Cited

U.S. PATENT DOCUMENTS

| | | | |
|---|---|---|---|
| 4,352,091 | 9/1982 | Yamasaki | 340/311.1 |
| 4,506,386 | 3/1985 | Ichikawa et al. | 340/825.44 |
| 4,518,961 | 5/1985 | Davis et al. | 340/825.44 |
| 4,593,273 | 6/1986 | Narcisse | 340/539 |
| 4,668,949 | 5/1987 | Akahori et al. | 340/825.47 |
| 4,745,408 | 5/1988 | Nagata et al. | 340/825.44 |
| 4,766,434 | 8/1988 | Matai et al. | 340/311.1 |
| 4,768,032 | 8/1988 | Sharpe et al. | 340/825.47 |
| 4,792,796 | 12/1988 | Bradshaw et al. | 340/539 |
| 4,802,240 | 1/1989 | Yamaguchi et al. | 340/825.44 |
| 4,803,703 | 2/1989 | DeLuca et al. | 375/116 |
| 4,804,954 | 2/1989 | Macnak et al. | 370/106 |
| 4,837,854 | 6/1989 | Oyagi et al. | 340/825.44 |

Primary Examiner—Donald J. Yusko
Assistant Examiner—Peter S. Weissman
Attorney, Agent, or Firm—Daniel R. Collopy; Vincent B. Ingrassia; William E. Koch

[57] ABSTRACT

A pager (1) includes switches (12,13,14,15) for setting the priority of a message expected to be received at a predetermined time on a substantially continuous carrier signal. A receiver (3) is then activated for a period of time determined by the priority setting prior to the expected time of the message. The length of the period of time is greater for a higher priority setting so that if the carrier signal is not detected, an alert is indicated either visually (9) or audibly (10) giving the user time to place himself into range of the carrier signal. Furthermore, the pager (1) may operate in a reduced power mode prior to the predetermined time.

13 Claims, 2 Drawing Sheets

OUT OF RANGE INDICATION FOR RADIO RECEIVERS

This is a continuation of application Ser. No. 07/341,876, filed Apr. 24, 1989 now abandoned.

BACKGROUND OF THE INVENTION

This invention relates generally to radio receivers of the type known as selective call receivers or pagers. More particularly, it relates to such pagers which receive a signal which is substantially continuous transmitted, the signal having messages thereon at predetermined times separated by relatively long time intervals.

By relatively long time intervals is meant humanly perceptive time intervals beyond thirty seconds, perhaps five minutes or longer. Pagers which only receive messages at such time intervals, include pagers operating on the POCSAG signalling system and receive periodic information updates, such as stock exchange pricing information or sports scores. Such an information service is commonly referred to as "mail-drop". Although such pagers may often be out of range, it has hitherto not been considered useful to perform an out-of-range indication for the entire time, if the pager only operates to receive at infrequent intervals.

However, the user of such a pager may want to know when he is out of range at the relevant time, and in response to such an indication, perhaps have the opportunity to place himself in range prior to the transmission of the message. While the user is not concerned about being out of range at times when the message will not be received.

SUMMARY OF THE INVENTION

Accordingly, the present invention provides a radio receiver for receiving a signal being substantially continuously transmitted and having messages thereon at predetermined times separated by relatively long time intervals greater that thirty seconds, the radio receiver comprising means for detecting the carrier signal; means for indicating whether the signal is detected; and means for enabling the detecting means for a relatively short time interval prior to the predetermined time and for disabling the detecting means after the predetermined time, wherein said relatively long time interval is substantially longer than said relatively short time interval.

Preferably, there is also provided means for adjusting the length of the relatively short time interval so that it may have different periods according to the priority of the transmitted message.

In accordance with the present invention, a radio receiver receives a signal having a periodic message. The message has an address assigned to the radio receiver. The radio receiver comprises a receiving means for receiving a first message and detecting the address therein and a power conservation means for disabling the receiving means for a predetermined time in response to the detection of the address.

BRIEF DESCRIPTION OF THE DRAWINGS

The invention will now be more fully described, by way of example only with reference to the drawings of which.

DESCRIPTION OF A PREFERRED EMBODIMENT

Figure 1:
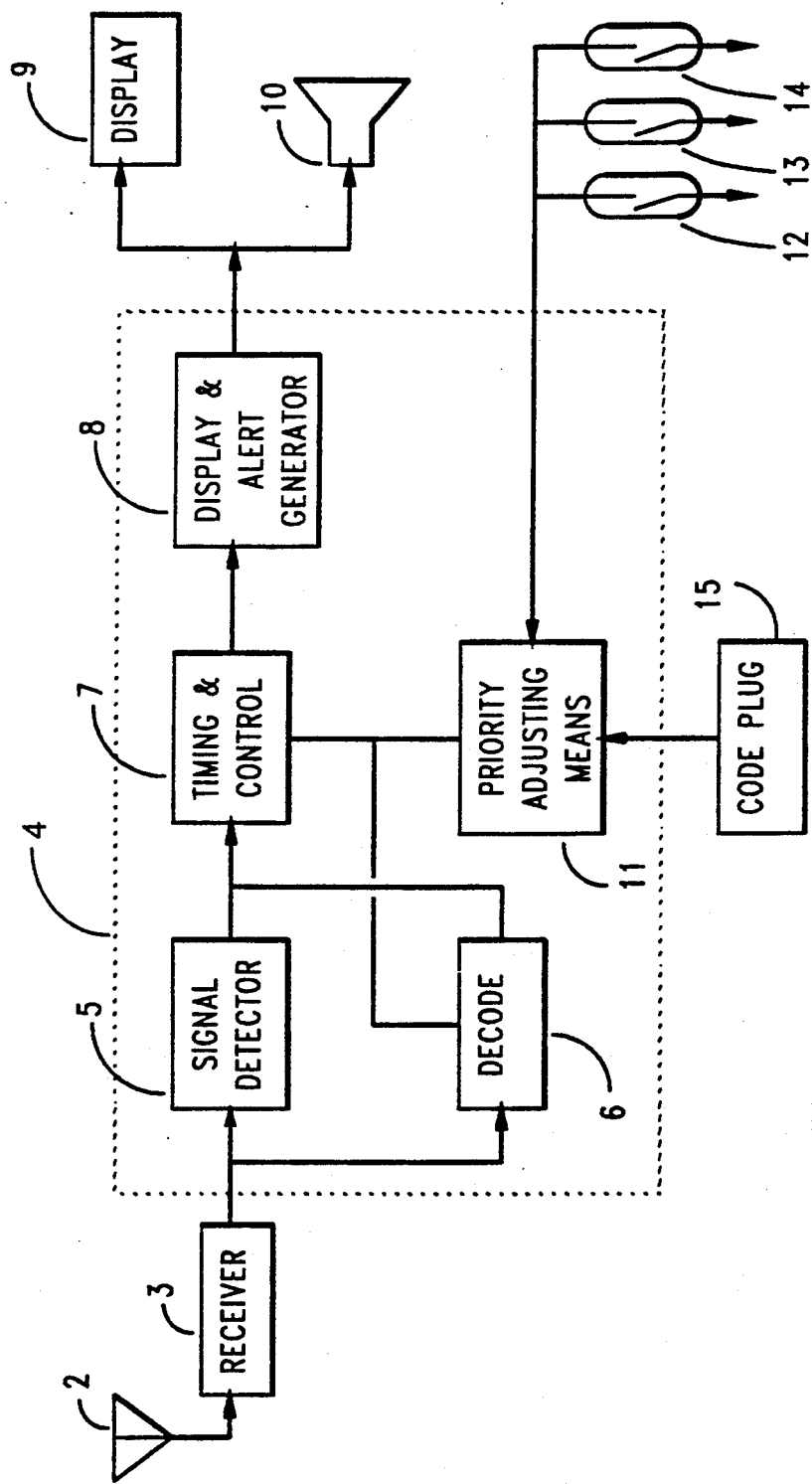
FIG. 1 is a schematic block diagram of a radio receiver according to the invention.

Thus, as is shown in FIG. 1, the radio receiver includes an aerial 2 coupled to a receiver 3. The receiver 3 is coupled to decoding means which may include a microcomputer 4 such as the MC146805L6 sold by Motorola Inc. The decoding means includes a signal detector 5, and a decoder 6, both controlled by a timing and control means 7 which also controls a display and alert generator 8 coupled to both a display 9 and a loudspeaker 10. The timing and control means 7 also receives an input from a priority adjusting means 11 which is coupled in parallel to three switches 12, 13 and 14 which are manually switchable by the operator of the radio receiver 1. The priority adjusting means is further responsive to a code plug 15, a reprogrammable memory device which may have a default priority setting as well as time intervals used in the invention stored therein. An enabling description of a pager having a microcomputer for decoding paging signals is included within U.S. Pat. No. 4,803,703 to DeLuca et al. which is hereby incorporated by reference.

Figure 2:
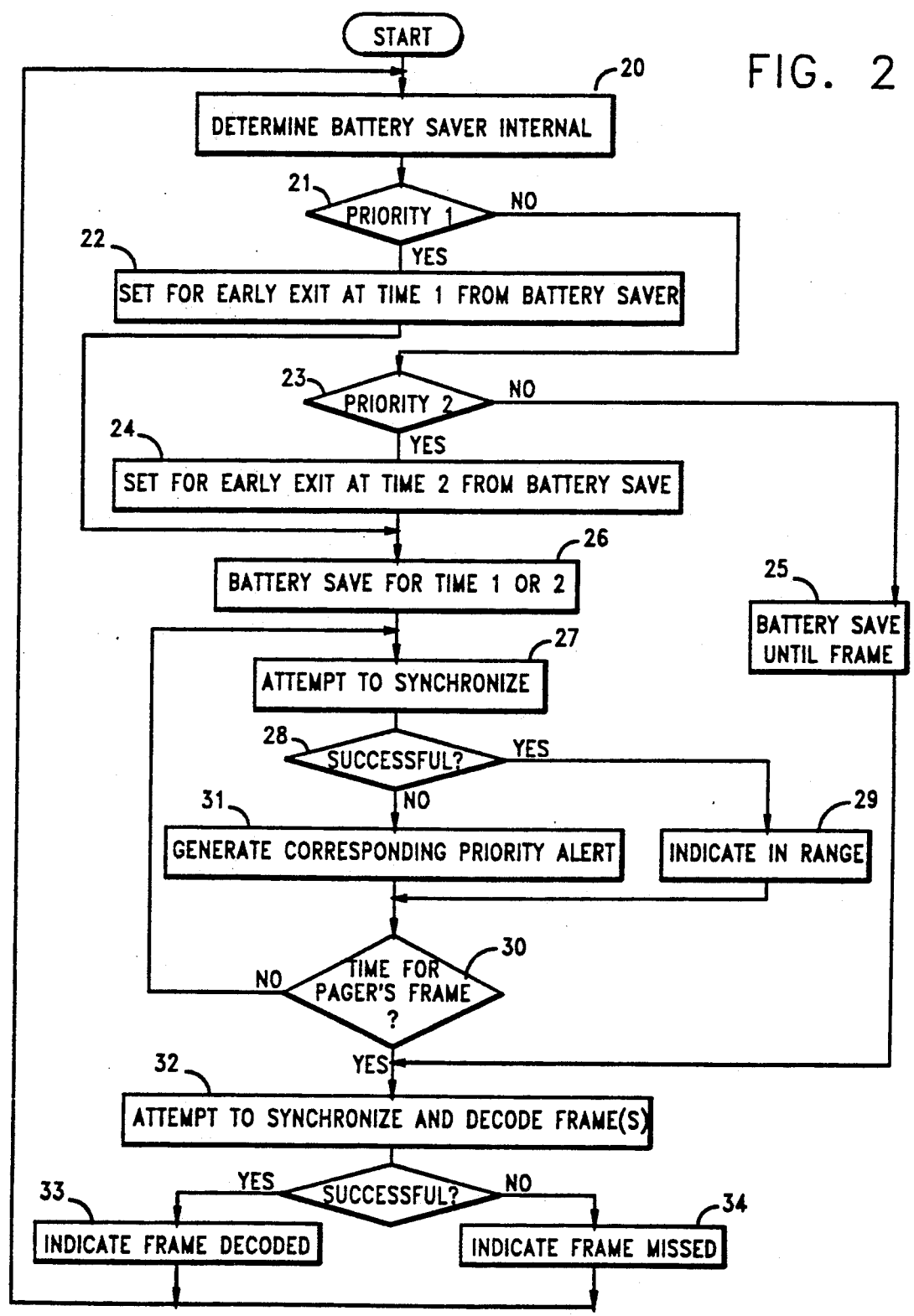
FIG. 2 is a flow chart for the radio receiver of FIG. 1.

Referring now also to FIG. 2, the function of the receiver of FIG. 1 will be explained. A receiver 1, such as a POCSAG pager having mail-drop operation would activate the receiver 3 at a predetermined time prior to the expected transmission of the pager's frame. Depending upon the priority of the expected information or message, the pager could be put into a high priority, low priority or no priority mode. This is done by enabling one of the switches 12, 13 or 14 respectively. Alternately, the priority for the pager could correspond to a signal stored in the code plug 15.

Prior to step 20, the paging receiver has synchronized to the POCSAG signal and received a first mail-drop message. This process is well known to those familiar with the art. After finding the first mail-drop message the occurrence in time of the subsequent mail drop message is predetermined. This time may be stored in the code plug 15, thereby allowing for configuration of the mail-drop service at the time of the pager sale where the capability to receive the mail-drop service is programmed into the pager.

For example, a pager configured to receive mail-drop information having stock market price quotes may have the information updated every five minutes. Alternately, a pager configured to receive mail-drop information having sports scores may have the information updated every thirty minutes. While a pager configured to receive the morning newspaper may be updated only once a day. The update interval corresponds to the predetermined time, and since no mail-drop information may be received during the predetermined time, the pager may deactivate the receiving means, thereby conserving power and improving battery saving. The improved battery saving is realized in response to the reception of a first mail-drop message. The predetermined time may vary between mail-drop information services and the predetermined time and corresponding battery saver interval may be stored in the code plug 15.

In step 20, the battery saver interval is determined. The priority determining means which has been programmed by either switches 12, 13, and 14, or the code plug 15 indicates the priority of the expected messages and determines the time to activate the receiver 3 as described below. The, switches cause the priority adjusting means 11 to program the timing and control means 7 for the battery saver interval required (20) according to the priority set. For example depressing switch 12, 13, or 14 would indicate a high, low, or no priority message setting, respectively. Alternately, the high, low or no priority message setting could be stored in the code plug and optionally modified by the switches.

If a high priority (21) message setting has been set, then the pager is programmed (22) to activate the receiver 3 for a time for searching for the signal prior to mail-drop transmission TIME 1 which is relatively long, e.g. five minutes. If a low priority (23) message setting has been set, then the pager is programmed (24) to activate the receiver for a relatively short time, e.g. 30 seconds prior to the mail-drop transmission, for searching for the signal. If the no priority message setting is made, then the pager remains (25) in the battery saving mode until the time of the mail-drop transmission.

If the pager has been programmed for searching for the signal prior to the time of the mail-drop transmission, i.e. in high or low priority, then the receiver is activated (26) at the corresponding predetermined time and it attempts to synchronize (27) to POCSAG signals which are being transmitted prior to the mail-drop signal. If synchronization is successful (28) i.e. the signal is being received by signal detector 5, then, optionally, an indication (29) that the pager is in range may be provided and the receiver remains synchronized until the pager's frame is due (30). The high and low priority times may be variable and stored in the code plug.

If, however, synchronization is not successful, i.e. the carrier signal is not received, then the control means 7 causes the display and alert generator 8 to generate an alert signal (31) to the user to alert him that the carrier signal is not received and thereby give the user the option of placing himself within range of transmission during the time remaining before transmission. Depending upon the priority of the expected transmission, the pager can be programmed to give different alert indications to the user. For example, if the pager is in high priority mode, the alert indication could be audio, using the loudspeaker 10, or vibrational (not shown) in nature. If the pager is in low priority mode, the alert indication could be visual, using the display 9, or, if there is no priority, no alert signal is given. In response to the user placing himself in range, the alert (31) terminates and the in range indication (29) is active.

Thus if a user were in the center building where radio signals are severely attenuated, and his thirty minute sports score were to be updated. Five minutes prior to the update, the pager would generate an out of range alert, in response to which the user would move towards of the periphery of the building where the radio signal is stronger. In response to which the pager would indicate that the user is now in range to receive the sports score update.

Whatever the priority, when the pager's frame is due (30), the receiver attempts to synchronize (32) with the carrier signal. The decoder 6 then attempts to decode the frame. If the decoding is successful and a message for the user is received than this may be indicated (33) in the usual way, which could be audio, visual or vibrational. If, however, the frame is not successfully decoded, then this is also indicated (34). Furthermore, the pager could note that it was out of range during transmission and that possible messages were not received. This would allow the user to contact the mail-drop message service in order to retrieve the information, if desired.

A pager such as has been described above, therefor combines all the advantages of full battery saving with providing information to the user on whether he is in range to receive a transmission or not. Such a pager may, of course, be used on any system, in many applications such as mail-drop applications on GSC or POCSAG systems wherein information is expected to be received by the pager at predetermined intervals.

I claim:

1. A radio receiver for receiving a signal having messages intended for the radio receiver thereon, the intended messages occurring at predetermined message times when reception of the intended messages are expected, adjoining ones of said predetermined message times separated by a predetermined relatively long time interval greater than thirty seconds during which reception of the intended messages is unexpected, the radio receiver comprising:
   means for detecting the signal;
   means for indicating the receiver is out of range of the signal;
   means for enabling the detecting means for a predetermined signal sampling time during the predetermined relatively long time interval during which reception of the intended messages is unexpected, said predetermined signal sampling time occurring a relatively short time interval prior to one of the predetermined message times; and
   means for activating the means for indicating upon completion of said predetermined signal sampling time if the signal is not detected by the detecting means during said predetermined signal sampling time,
   wherein said predetermined relatively long time interval is substantially longer than said relatively short time interval and said relatively short time interval is longer than said predetermined signal sampling time.

2. A radio receiver according to claim 1 wherein said means for detecting the signal includes means for synchronizing to said signal.

3. A radio receiver according to claim 1 further comprising means for adjusting said relatively short time interval.

4. A radio receiver according to claim 3 further comprising means for defining a priority of said intended messages coupled to said means for adjusting, wherein said means for adjusting adjusts said relatively short time interval in response to said priority of said intended messages.

5. A radio receiver according to claim 4 wherein said means for defining includes three priority settings for defining said priority of said intended messages, and wherein said means for adjusting adjusts the relatively short time interval in response to said priority of said intended messages.

6. A radio receiver according to claim 1 further comprising a means for receiving the intended messages at the predetermined message times and nonreception indicating means responsive to the means for receiving the messages for indicating the nonreception of one of the intended messages when said one of the intended messages is not received at a corresponding one of the predetermined message times.

7. A radio receiver according to claim 3 wherein said means for indicating comprises audio, visual and/or vibrational indicating means.

8. A radio receiver according to claim 7 further comprising user-operable means for defining a plurality of priority settings of said intended messages, said user-operable means coupled to said means for adjusting, wherein said means for adjusting adjusts said relatively short time interval in response to said priority settings of said intended messages, said user-operable means further coupled to said means for indicating wherein the plurality of priority settings determine which of the audio, visual and/or vibrational indicating means is is activated by the means for activating to indicate that the signal has not been detected.

9. In a radio receiver for receiving a signal comprising periodically transmitted messages intended for said radio receiver, said periodically transmitted messages having expected occurrences separated by unexpected message times when said periodically transmitted messages are not expected, a method for indicating the receiving condition of said signal comprising:

receiving one of said periodically transmitted messages;

activating a signal detector during a subsequent one of said unexpected message times at a first predetermined time interval prior to a corresponding subsequent one of said periodically transmitted messages;

deactivating said signal detector a second predetermined time interval after said step of activating said signal detector, wherein said first predetermined time interval is substantially longer than said second predetermined time interval; and activating an out of range indicating means if said signal detector does not detect said signal.

10. The method of claim 9 further comprising the steps of:

activating the signal detector for receiving said subsequent one of said periodically transmitted messages at the expected occurrence of said subsequent one of said periodically transmitted messages if said signal detector detects said signal during said second predetermined time interval;

deactivating the signal detector after receiving said subsequent one of said periodically transmitted messages; and reactivating the signal detector said first predetermined time interval prior to the next subsequent occurrence of one of said periodically transmitted messages.

11. The method of claim 9 wherein the unexpected message times are greater than thirty seconds.

12. The method of claim 9 wherein a third predetermined time interval of each of said unexpected message times between said periodically transmitted messages is greater than ten minutes and said first predetermined time interval prior to one of said periodically transmitted messages corresponds to less than half of the third predetermined time interval.

13. The method of claim 9 further comprising the step of establishing at least a first and second priority for the periodically transmitted messages and wherein said second predetermined time period comprises one of a plurality of predetermined time periods, and wherein the step of activating further includes the step of activating the signal detector at a first of said plurality of predetermined time periods prior to the subsequent one of said periodically transmitted messages in response to a first priority established or activating the signal indicating means at a second of said plurality of predetermined time periods prior to the subsequent one of said periodically transmitted messages in response to a second priority established.

* * * * *